US007797076B2

(12) United States Patent
Isozumi et al.

(10) Patent No.: US 7,797,076 B2
(45) Date of Patent: Sep. 14, 2010

(54) CONTROL UNIT FOR POWDER MATERIAL COMPRESSION MOLDING MACHINE

(75) Inventors: Masatsugu Isozumi, Kyoto (JP); Naoshige Kitamura, Kyoto (JP)

(73) Assignee: Kikusui Seisakusho Ltd., Kyoto-shi, Kyoto (JP)

( * ) Notice: Subject to any disclaimer, the term of this patent is extended or adjusted under 35 U.S.C. 154(b) by 203 days.

(21) Appl. No.: 11/979,439

(22) Filed: Nov. 2, 2007

(65) Prior Publication Data

US 2008/0262645 A1 Oct. 23, 2008

(30) Foreign Application Priority Data

Apr. 18, 2007 (JP) .......................... P2007-109794

(51) Int. Cl.

| | |
|---|---|
| ***G06F 19/00*** | (2006.01) |
| *B29C 39/00* | (2006.01) |
| *B29C 45/00* | (2006.01) |
| *B29C 47/92* | (2006.01) |
| *B29C 45/76* | (2006.01) |

(52) U.S. Cl. ...................... 700/204; 700/118; 700/163; 700/197; 700/203; 700/206; 425/140; 425/141; 425/147; 425/148; 264/40.4; 264/40.5

(58) Field of Classification Search .................. 700/98, 700/118, 163, 197, 203–204, 206; 427/136, 427/138, 140–141; 264/40.4–40.5; 425/140–141, 425/147–150

See application file for complete search history.

(56) References Cited

U.S. PATENT DOCUMENTS 3,910,737 A * 10/1975 Shimada et al. ............. 425/140
3,915,693 A * 10/1975 Rasmussen .................. 75/304
4,238,431 A * 12/1980 Stuben et al. .............. 264/40.5
4,419,413 A * 12/1983 Ebihara ...................... 428/548
4,452,579 A * 6/1984 Janson ....................... 425/140
4,526,735 A * 7/1985 Norota et al. ............... 264/450
4,583,487 A * 4/1986 Wood ......................... 118/308
4,999,151 A * 3/1991 Hinzpeter .................. 264/40.4
5,035,597 A * 7/1991 Tanaka et al. ............... 425/135
5,074,774 A * 12/1991 Nose et al. .................. 425/148
5,250,255 A * 10/1993 Sagawa et al. ................ 419/39
5,322,655 A * 6/1994 Ebey ......................... 264/40.5
6,197,251 B1 * 3/2001 Hashimoto et al. ............. 419/2
6,325,609 B1 * 12/2001 Shimada ..................... 425/140

(Continued)

FOREIGN PATENT DOCUMENTS

JP 2975346 9/1999

*Primary Examiner*—Ramesh B Patel
(74) *Attorney, Agent, or Firm*—McGinn IP Law Group, PLLC

(57) ABSTRACT

A control unit for a powder material compression molding machine including a powder material compressor which compresses a powder material filled between compressing members in an adjusted filled amount by making the compressing members approach to each other at a predetermined interval, so as to mold a molded product, and a pressure detector which detects a powder material compressing pressure by the powder material compressor. The control unit including a weight determiner which determines that the weight of filled powder material is normal, a thickness determiner which determines that the thickness of the molded product is abnormal in the case where the pressure detected by the pressure detector falls out of a first predetermined range when the weight determiner determines normality, and a compression controller which controls the powder material compressor when the thickness determiner determines abnormality.

12 Claims, 8 Drawing Sheets

U.S. PATENT DOCUMENTS 6,422,755 B1 * 7/2002 Cadle et al. ................. 384/433
7,381,356 B2 * 6/2008 Shimada et al. ............... 264/39
2005/0200038 A1 * 9/2005 Vogeleer et al. ............ 264/40.1
2007/0029691 A1 * 2/2007 Nakamura et al. .......... 264/109

* cited by examiner

CONTROL UNIT FOR POWDER MATERIAL COMPRESSION MOLDING MACHINE

FIELD OF THE INVENTION

The invention relates to a control unit which controls a rotary type powder material compression molding machine for compressing a powder material so as to fabricate a product such as a medical tablet or food in such a manner that a finished product meets standards.

BACKGROUND OF THE INVENTION

In general, a molded product such as a tablet or food has been conventionally required to be substantially uniform in weight or thickness. It is difficult to measure the amount of powder material before being molding per molded product in a powder material compression molding machine for fabricating numerous molded products in a short period of time, like a continuously tablet compressing machine. In view of this, a pressure during compression has been conventionally detected, and then, the amount of powder material to be inserted into a die has been automatically controlled such that the detected pressure becomes a certain reference pressure previously calculated in accordance with a target amount of powder material in a powder material compression molding machine for inserting a punch into a die deeply to a predetermined position so as to compressively mold a powder material in consideration of an approximately one-to-one relationship between a weight of a molded product and a pressure in compressing a powder material.

However, there may occur a fear of variations of the weight of a molded product since the above-described one-to-one relationship is broken up due to expansion or shrinkage caused by heat generated at the die or the punch, fluctuations in distribution of a grain size of a powder material or fluctuations in flow even if a tablet compressing pressure is controlled to become the reference pressure in a method for indirectly controlling the weight of the molded product in the above-described manner. Therefore, there has been conventionally known a controlling method disclosed in, for example, Japanese Patent No. 2975346 (corresponding U.S. Pat. No. 6,325,609), in which a tablet compressing pressure and the weight and thickness of a molded product are measured; the amount of powder material is adjusted based on the tablet compressing pressure; the amount of powder material is adjusted based on the measured weight of the molded product during the stoppage of the adjustment of the amount of powder material based on the tablet compressing pressure; and the tablet compressing pressure is adjusted based on the measured thickness of the molded product. The controlling method disclosed in Japanese Patent No. 2975346 is configured such that when an actually measured weight and an actually measured thickness fall within an allowable range, a previously calculated reference pressure is calibrated in accordance with a predetermined reference amount of powder material based on an actually measured pressure.

In the above-described powder material compression molding machine, the weight and thickness of the product are related to each other such that the control, that is, the adjustment of either one of the weight and thickness at the time of fabrication exerts an influence on the other. In the controlling method disclosed in Japanese Patent No. 2975346, the weight and thickness of the product are measured at the same time when the product is sampled, and then, both of the weight and the thickness are controlled based on the measurement result, so that the reference pressure is calibrated. However, as described above, if the length of the punch, for example, is increased due to an increase in heat inside of the powder material compression molding machine after the start of the fabrication, the tablet compressing pressure is increased while the thickness is decreased. Here, the calibration of the reference pressure possibly induces an inconvenience. In other words, in the case where the punch expands with the same weight of the product, the tablet compressing pressure is increased while the thickness is decreased. When the thickness is decreased, a compression position is adjusted in such a manner that the thickness approximates to a reference thickness, thereby varying the tablet compressing pressure. In such a case, if the reference pressure is calibrated based on the tablet compressing pressure at that time, the weight is unfavorably changed in order to adjust the amount of powder material based on the calibrated reference pressure.

SUMMARY OF THE INVENTION

In view of this, the invention has been accomplished to solve the above-described problems.

That is to say, a control unit for a powder material compression molding machine according to the invention including powder material compressing means which compresses a powder material filled between compressing members in an adjusted filled amount by making the compressing members approach to each other at a predetermined interval, so as to mold a molded product, and pressure detecting means which detects a powder material compressing pressure by the powder material compressing means, in electric connection to the powder material compression molding machine, includes: weight determining means which determines that the weight of filled powder material is normal; thickness determining means which determines that the thickness of the molded product is abnormal in the case where the pressure detected by the pressure detecting means falls out of a first predetermined range when the weight determining means determines normality; and compression controlling means which controls the powder material compressing means when the thickness determining means determines abnormality.

With the above-described configuration, if the pressure during the compression falls out of the first predetermined range in the case where the weight determining means determines that the weight of a powder material to be compressed is normal, the thickness determining means determines that the thickness of the molded product is abnormal. The compression controlling means controls the powder material compressing means based on the determination result, thus making the thickness of the molded product normal. As a consequence, the thickness, that is, the hardness can be adjusted without adversely influencing the weight of the molded product.

In the above-described configuration, the first predetermined range is defined by a first upper limit and a first lower limit smaller than the first upper limit; and the detected compressing pressure falls out of the first predetermined range when it is the first upper limit or greater or the first lower limit or smaller.

In order to efficiently obtain the molded product in conformity with the standard, it is preferable that a control unit for a powder material compression molding machine according to the invention should further include: in addition to the above-described constituents, filled amount adjusting means which adjusts the filled amount of powder material; and filled amount controlling means which controls the filled amount adjusting means based on abnormality determined when the weight determining means determines the abnormal weight;

wherein the powder material compressing means is controlled by the compression controlling means while the filled amount adjusting means is controlled by the filled amount controlling means.

Moreover, a control unit for a powder material compression molding machine according to the invention includes: powder material compressing means which compresses a powder material filled between compressing members by making the compressing members approach to each other at a predetermined interval, so as to mold a molded product; filled amount adjusting means which adjusts the amount of powder material to be filled; pressure detecting means which detects a powder material compressing pressure by the powder material compressing means; filled amount controlling means which controls the filled amount adjusting means based on the compressing pressure detected by the pressure detecting means; and compression controlling means which controls the powder material compressing means based on the compressing pressure detected by the pressure detecting means; wherein the powder material compressing means is controlled by the compression controlling means while the filled amount adjusting means is controlled by the filled amount controlling means.

Note that the powder material according to the invention signifies an aggregate of fine solid matter, including an aggregate of granular material such as so-called granules and an aggregate of powder material smaller in size than the granular material.

The invention is configured, as described above, such that if the pressure during the compression falls out of the first predetermined range in the case where the weight of a powder material to be compressed is normal, it is determined that the thickness of the molded product is abnormal, thereby controlling the powder material compressing means so as to make the thickness of the molded product normal. As a consequence, the thickness, that is, the hardness can be adjusted without adversely influencing the weight of the molded product.

DETAILED DESCRIPTION OF THE PREFERRED EMBODIMENTS

A description will be given below of a preferred embodiment according to the invention in reference to the attached drawings.

Figure 1:
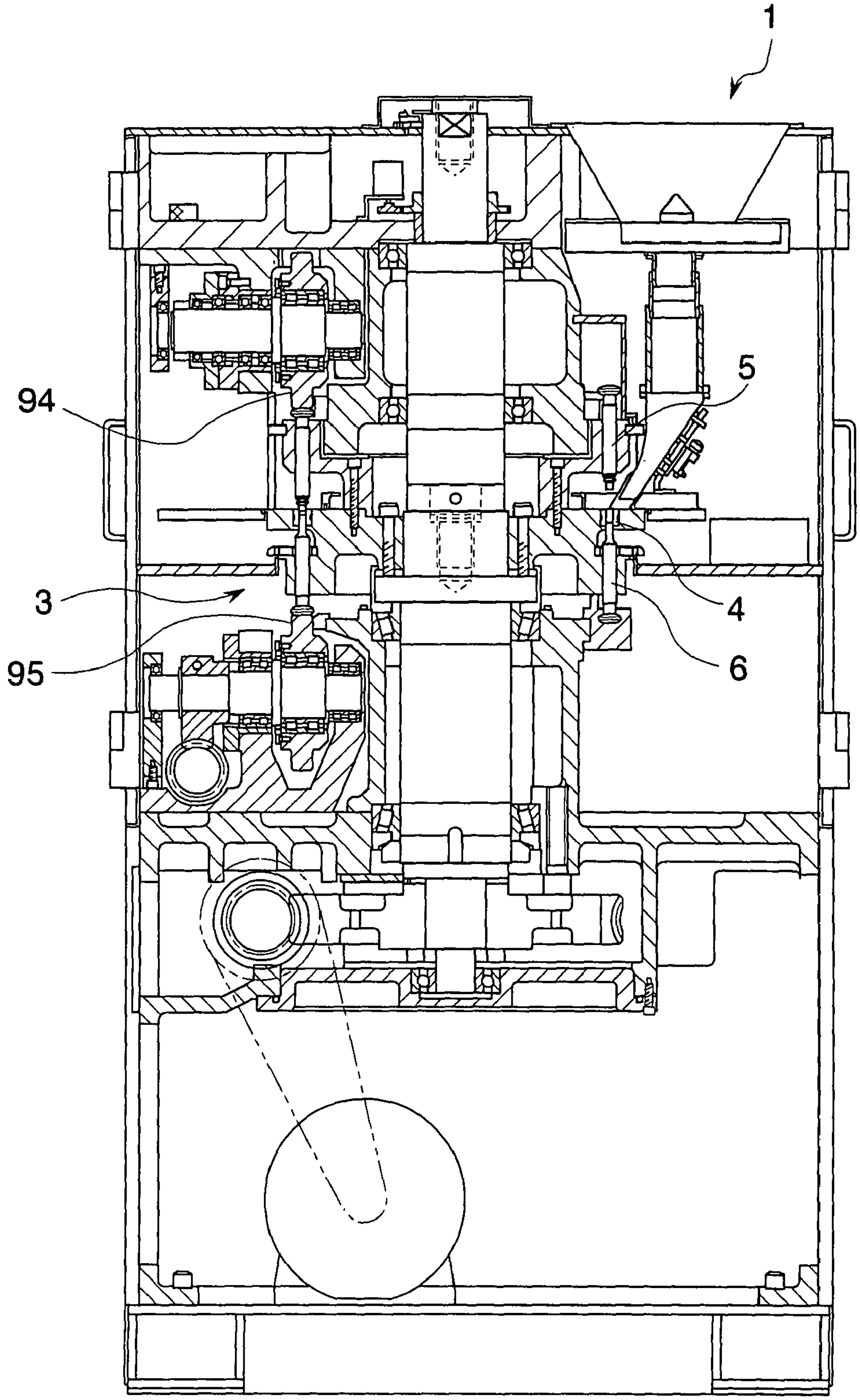
FIG. 1 is a cross sectional view showing a molding machine body of a powder material compression molding machine in a preferred embodiment according to the invention.
Figure 2:
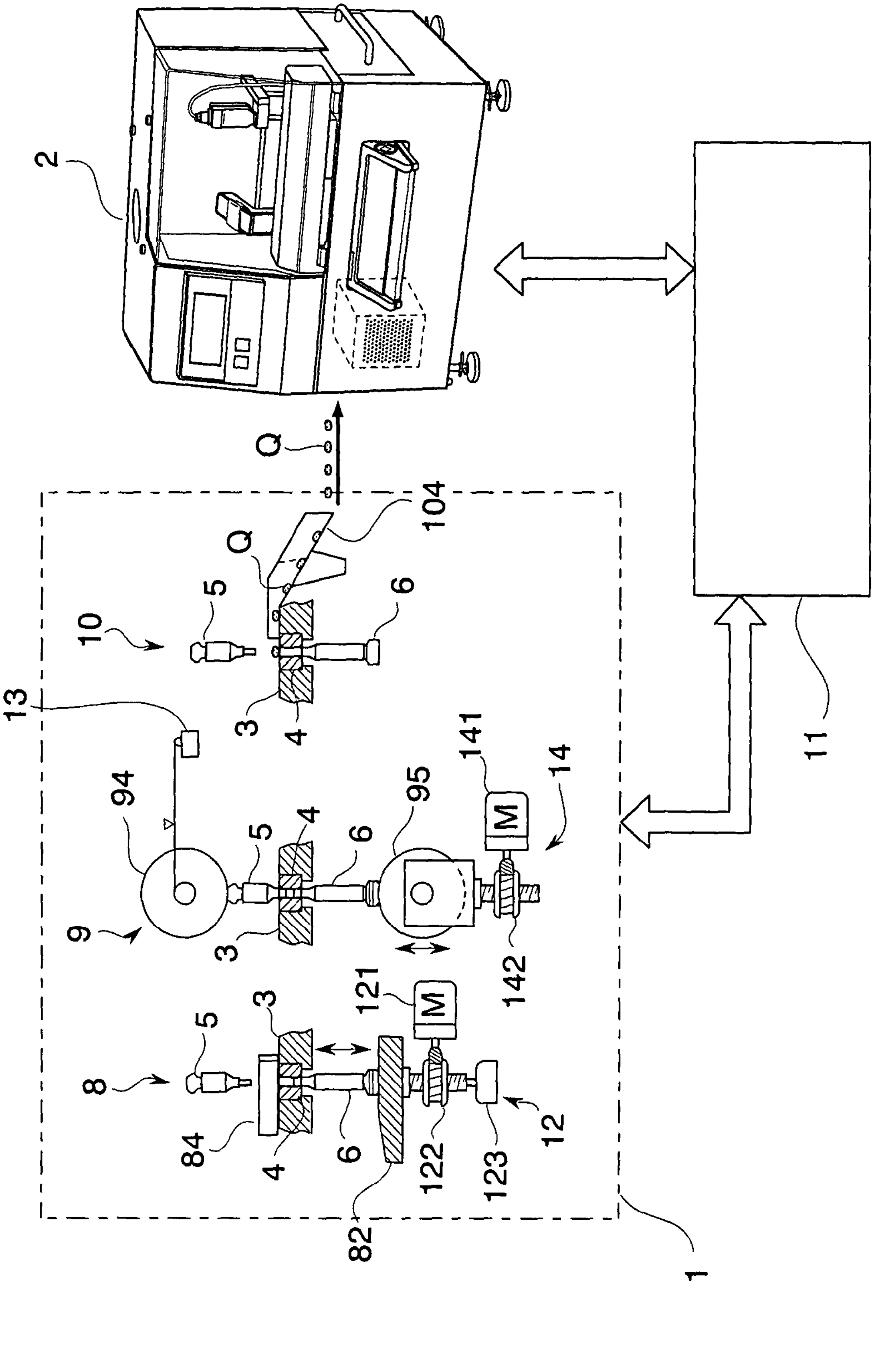
FIG. 2 is a view schematically showing the entire configuration including a control unit in the preferred embodiment.

A powder material compression molding machine in the present preferred embodiment is adapted to mold, for example, a medical tablet, and includes, as shown in FIGS. 1 and 2: a machine body 1 which mainly compresses a tablet; a measuring instrument 2 serving as measuring means which samples a tablet Q as a molded product molded by and conveyed from the machine body 1, and then, measures various statuses; and a control unit 11 which feeds back a measurement result by the measuring instrument 2, so as to control various conditions required for molding the tablet by the machine body 1.

Figure 3:
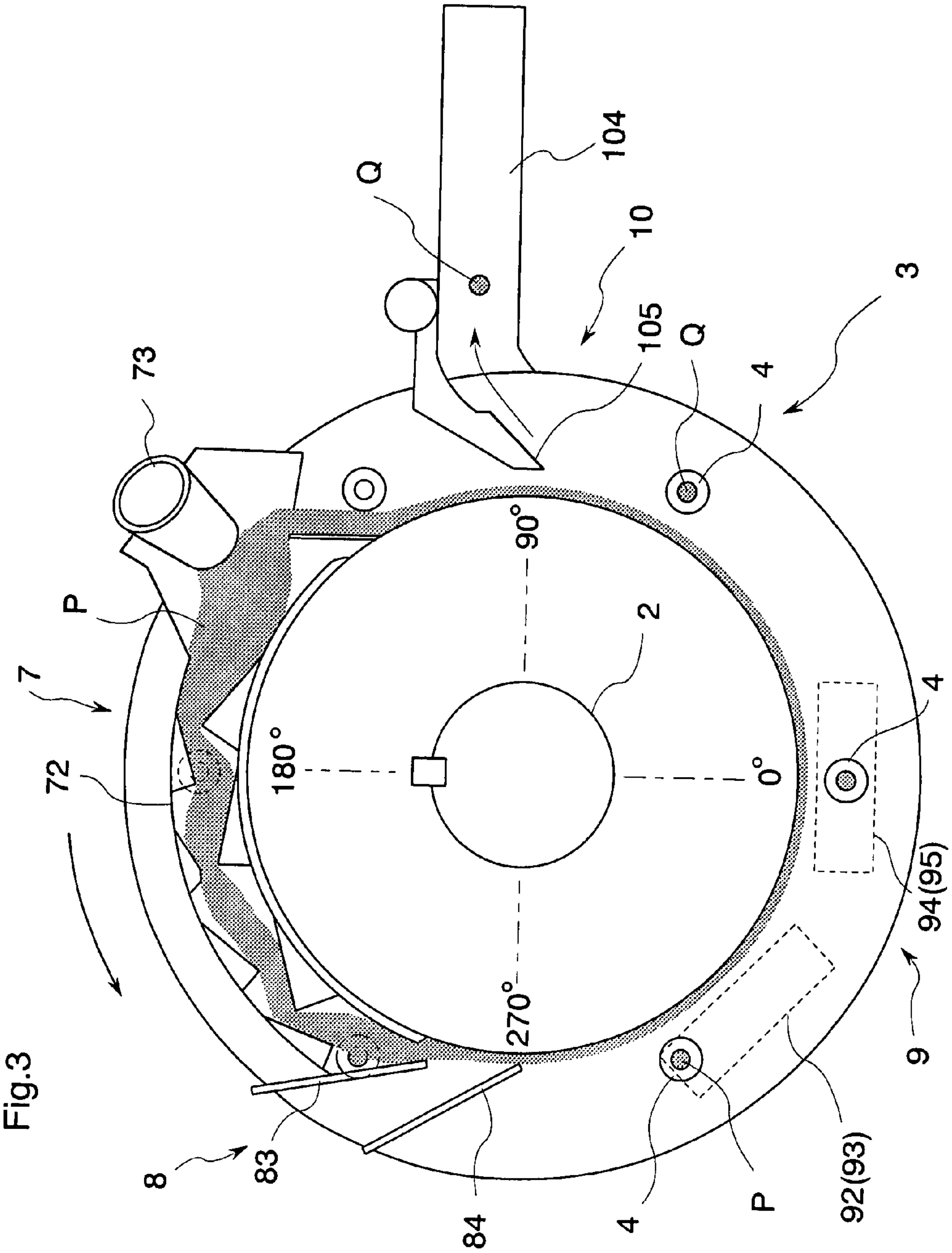
FIG. 3 is a plan view showing the arrangement of essential portions on a turret in the molding machine body in the preferred embodiment.

The machine body 1 is of a rotary type. A plurality of cylindrical dies 4 are detachably attached at predetermined pitches on a turret 3 disposed in a horizontally rotatable manner, and further, above and under each of the dies 4 are vertically slidably held an upper punch 5 and a lower punch 6 serving as compressing members whose tips can be inserted into and withdrawn from the die 4 at the inner circumference thereof in alignment of their axes with the axis of the die 4, as shown in FIG. 3. The die 4, the upper punch 5 and the lower punch 6 are such configured as to be rotated in synchronism with the turret 3.

In the machine body 1 are disposed a powder material filling portion 7, a powder material leveling portion 8, a compressively molding portion 9 and a product unloading portion 10 in sequence in a rotation direction of the turret 3.

In the powder material filling portion 7, a powder material P supplied onto the turret 3 by descending the lower punch 6 is introduced into the die 4 by a feed shoe 72. Here, the powder material P is supplied onto the turret 3 by a powder material supplying mechanism 73. Although the powder material P is a raw material of the tablet Q in the present preferred embodiment, it may be an aggregate of granular material such as so-called granules.

The powder material leveling portion 8 ascends the lower punch 6 up to a predetermined position by a quantity adjusting rail 82, and further, removes the powder material P, which overflows from the die 4 caused by the ascendance of the lower punch 6, from the die 4 by leveling plates 83 and 84. In the present preferred embodiment, there is additionally provided a powder material amount adjuster 12 for adjusting the amount of powder material to be filled. The powder material amount adjuster 12 is configured such that the predetermined position of the lower punch 6 is vertically moved by vertically moving the quantity adjusting rail 82, thus adjusting the amount of powder material to be filled into the die 4, as shown in FIG. 2. Specifically, the powder material amount adjuster 12 includes an electric motor 121, a converting mechanism 122 for converting the rotation of the electric motor 121 into a linear motion required for changing the position of the quantity adjusting rail 82 via a gear train, and a potentiometer 123 serving as a position sensor for detecting the position of the quantity adjusting rail 82.

Figure 4:
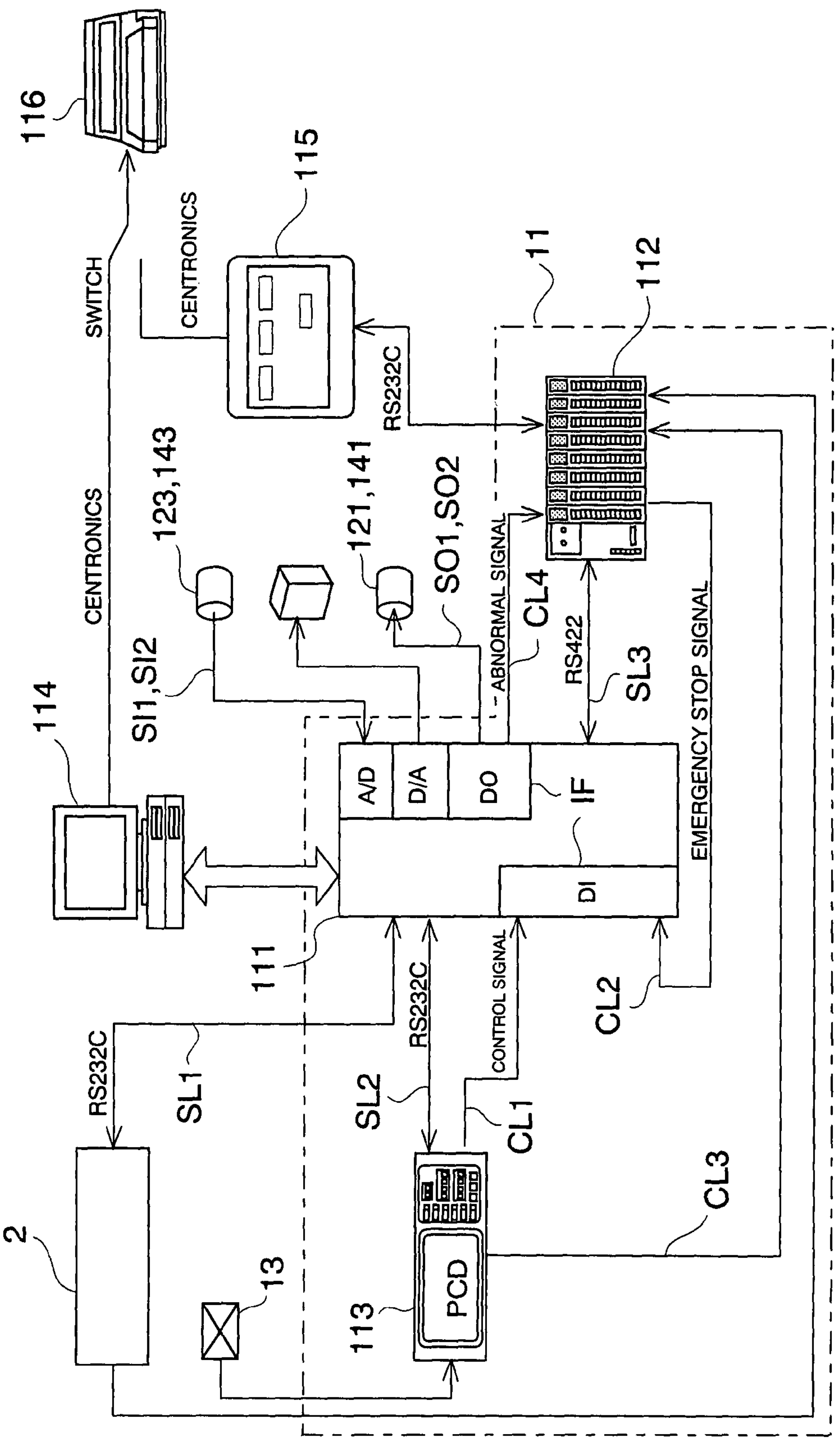
FIG. 4 is a block diagram illustrating the configuration of a control system including the control unit in the preferred embodiment.

The compressively molding portion 9 descends the upper punch 5, and thus, inserts the tip of the upper punch 5 into the die 4. Upper and lower pre-compression rolls 92 and 93 restrict, from above and under, the upper punch 5 and the lower punch 6 whose tips are inserted into the die 4, so as to pre-compress the powder material P contained inside of the die 4. Subsequently, upper and lower main compression rolls 94 and 95 restrict, from above and under, the upper punch 5 and the lower punch 6, so as to mainly compress the powder, material P contained inside of the die 4. The compressively molding portion 9 serves as powder material compressing means. In the present preferred embodiment, there is additionally provided a load cell 13 serving as pressure detecting means, which detects a pressure generated when the powder material P is compressed by the upper main compression roll 94, relevantly to the rotational axis of the upper main compression roll 94, as shown in FIG. 4. Furthermore, a compression position adjuster 14 for adjusting a vertical position of the lower main compression roll 95 is additionally provided relevantly to the rotational axis of the lower main compression roll 95. The compression position adjuster 14 includes an electric motor 141, and a converting mechanism 142 for converting the rotation of the electric motor 141 into a linear motion required for changing the position of the lower main compression roll 95 via a gear train.

The product unloading portion 10 ascends the upper punch 5, to thus withdraw the tip of the upper punch 5 from the die 4, and further, urges the lower punch 6 upward so as to entirely push, outside of the die 4, the tablet Q contained inside of the die 4. Thereafter, the pushed-out tablet Q is guided sideways to a chute 104 by the use of a guide plate 105.

The molding machine body 1 such configured as described above successively molds the tablets Q per 30 msec, for example, from the powder material by utilizing the upper and lower punches 5 and 6 and the die 4 while rotating the turret 3.

The measuring instrument 2 serving as the weight measuring means shown in FIG. 4 contains therein at least a weight measuring mechanism and a hardness measuring mechanism, not shown, and thus, can automatically measure the weight and hardness of the tablet Q which has been guided to the chute 104 and appropriately sampled. As the measuring instrument 2 may be used a measuring instrument disclosed in Japanese Utility Model Registration No. 3025263 granted to the present applicant. The measuring instrument 2 is basically configured such that the sampled tablets Q are sequentially conveyed to, the weight measuring mechanism and the hardness measuring mechanism mounted on a tablet conveying rail disposed inside, not shown, by tablet conveying means. Resultant measurement data can be automatically processed, stored or the like by an internal controller, can be displayed on a display or a printer, or can be transferred to another equipment, specifically, a first controller 111 in the control unit 11 via a serial signal line SL1 by the use of RS232C. Particularly in the present preferred embodiment, the plurality of tablets Q are measured such that an average of the measurement data can be calculated.

As shown in FIG. 4, the control unit 11 is referred to as a microcomputer, and constituted of mainly the first controller 111 incorporating therein a CPU, a memory, an input/output interface IF and the like; a second controller 112 serving as a sequencer; and a third controller 113 which receives a signal output from the load cell 13 and processes data relevant to a pressure. These first to third controllers 111 to 113 are interconnected to each other via serial signal lines SL2 ad SL3 and control signal lines CL1 to CL4 in cooperation with each other. The control unit 11 also is provided with various other interfaces, and therefore, can be expanded by connecting a personal computer 114, a special display 115, a printer 116 or a host computer, not shown.

In the present preferred embodiment, the first controller 111 outputs a control signal S01 from the electric motor 121 for vertically driving the quantity adjusting rail 82, and further, receives a detection signal SI1 from the potentiometer 123 for detecting the amount of vertical motion, thereby forming a local feedback loop, so as to give the control unit 11 a roll as powder material amount controlling means for controlling the powder material amount adjusting means 12.

In the same manner, the first controller 111 outputs a control signal SO2 from the electric motor 141 for vertically driving the lower main compression roll 95, and further, receives an output signal from the load cell 13 for indirectly detecting the amount of vertical motion, thereby forming a local feedback loop, so as to give the control unit 11 a roll as compression controlling means for controlling the compression position adjusting means 14.

Next, explanation will be made below on operation of the control unit 11.

The control unit 11 stores therein a control program, that is, a thickness control program for use in controlling the amount of powder material to be filled in the molding machine body 1 and the pressures of the upper and lower main compression rolls 94 and 95 together with data on various set values required for the control. The thickness control program is used in controlling the thickness of the tablet Q in the case where it is determined that a change in compressive pressure is caused by thermal extension of the upper punch 5 and the lower punch 6 when the compressive pressure is changed irrespective of the normal weight of the tablet Q as a molded product after the powder material P is started to be compressively molded. In other words, when the powder material P is started to be compressively molded, the temperature of each of the punches 5 and 6 is increased due to heat generation caused by a contact friction between the upper punch 5 and each of the upper compression rolls 92 and 94, heat generation caused by a contact friction between the lower punch 6 and each of the lower compression rolls 93 and 95, and heat generation caused by compressively molding the powder material. As a consequence, the upper punch 5 and the lower punch 6 extend, so that the position of the lower main compression roll 95 is adjusted to adjust the thickness of the tablet Q in the case where the filled amount of powder material, that is, the weight of the tablet Q is normal based on the dependence of the variations in compressive pressure not on the filled amount of powder material but on a distance between the respective tips of the upper punch 5 and the lower punch 6.

Figure 5:
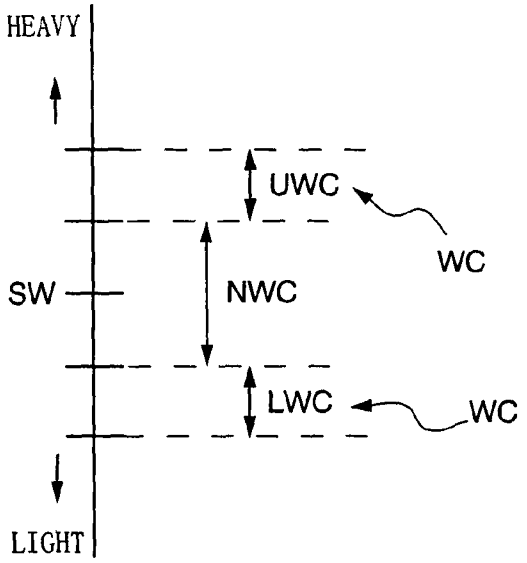
FIG. 5 is a graph illustrating the relationship of a weight setting value relevant to quantity control in the preferred embodiment.
Figure 6:
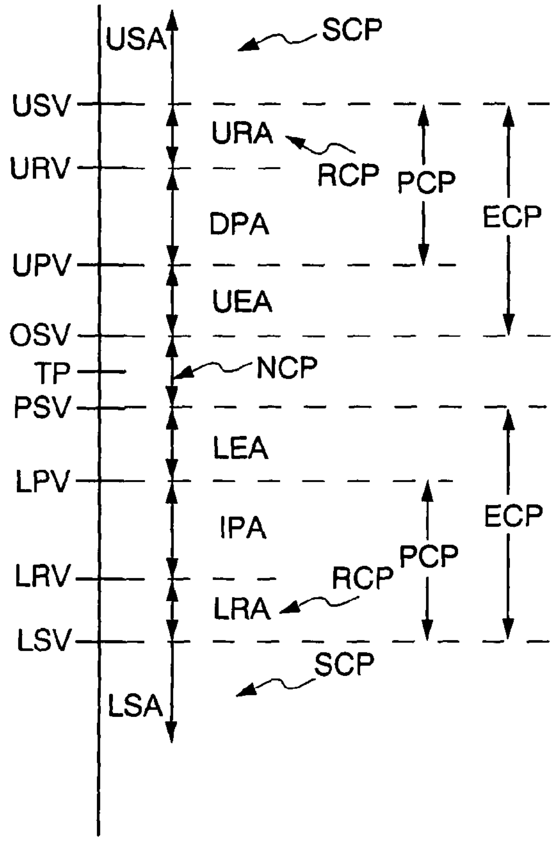
FIG. 6 is a graph illustrating the relationship of a pressure setting value relevant to thickness control in the preferred embodiment.
Figure 7:
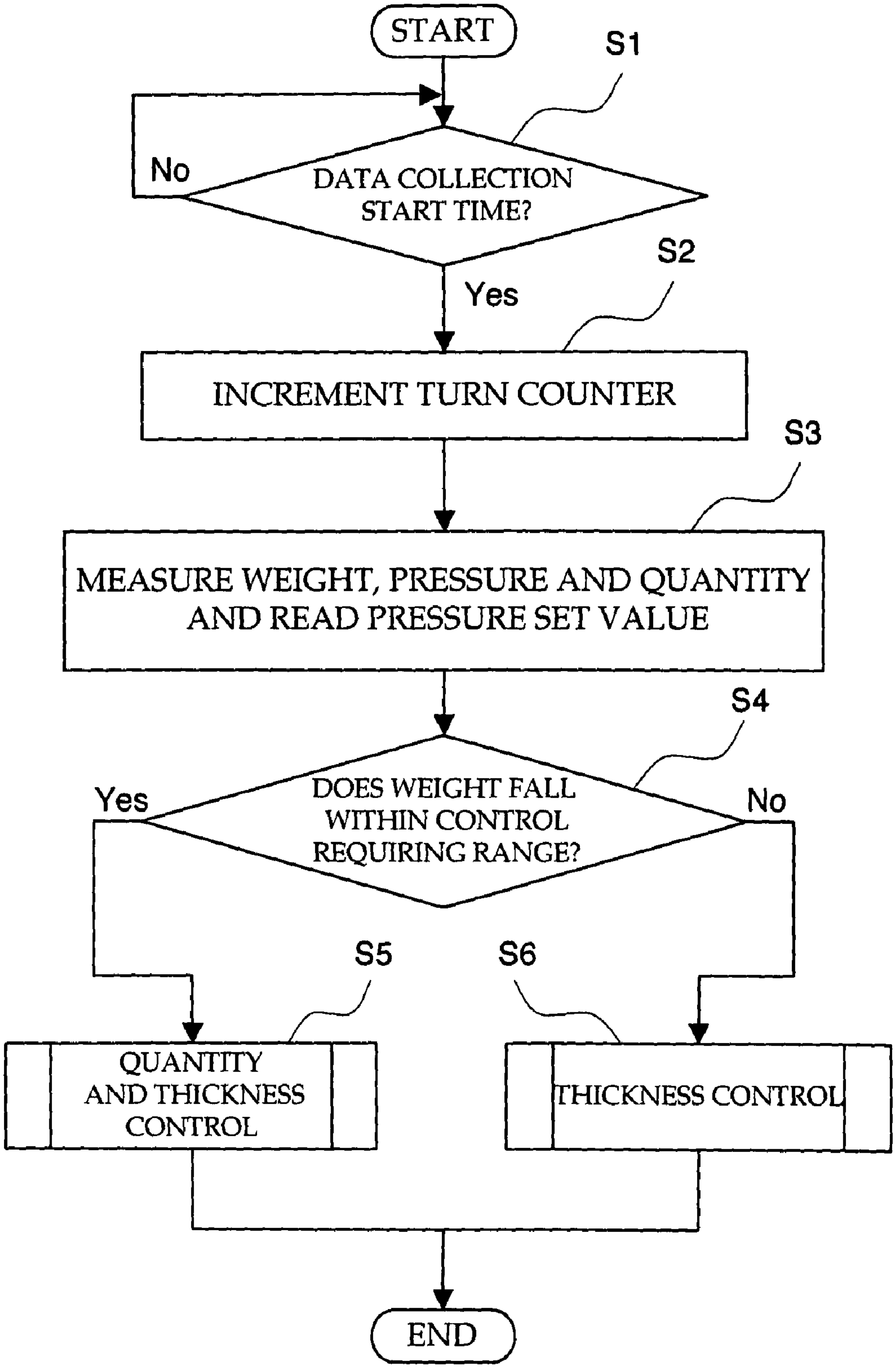
FIG. 7 is a flowchart illustrating schematic control procedures in the preferred embodiment.

The control unit 11 stores therein data such as a standard weight SW of the tablet Q, a non-control range NWC and a control requiring range WC, as illustrated in FIG. 5, which are set based on the standard weight SW, a target pressure set value TP as a reference pressure for compressive molding, and a compressive control range as a criterion of a good or bad tablet Q, as illustrated in FIG. 6, as data for use in the control in association with the thickness control program.

The standard weight SW is a reference value of the tablet Q to be molded. The non-control range NWC illustrated in FIG. 5 defines the weight range of the tablet Q which does not require a quantity control, that is, a weight control, described later. The non-control range NWC is set by values higher and lower than the standard weight SW, for example, by values higher and lower by 5% than the standard weight. In the present preferred embodiment, the standard weight SW is set to correspond to not the weight of one tablet Q but the total weight of the predetermined number of tablets Q. In the meantime, the control requiring range WC defines the weight range of the tablet Q which requires the quantity control, and is set based on the standard weight SW and the non-control range NWC. Specifically, the control requiring range WC is set within, for example, a range obtained by excluding the non-control range NWC from a weight range from a value higher by 10% than the standard weight SW to a value lower by 10% than the standard weight SW. A region above the non-control range NWC is designated by an upper control requiring range UWC while a region under the non-control range NWC is designated by a lower control requiring range LWC. Here, the weight is measured within the weight range defined by increasing or decreasing the standard weight SW by 50%.

As illustrated in FIG. 6, a compression control range is set in such a manner as to perform various controls in four steps centering on the target pressure set value TP. Specifically, the compression control range consists of: an increase/decrease control range portion PCP, at which execution of a thickness control is determined, described later, centering on the target pressure set value TP; a decompression/compression control range portion ECP, at which the thickness control is executed in the case where the weight of the tablet Q is included within the non-control range NWC; a removal control range portion RCP, which is set in regions above and under inside of the decompression/compression control range portion ECP and at which it is determined whether or not the tablet Q is controlled to be removed; a stoppage control range portion SCP, which is set in regions above and under outside of the removal control range portion RCP and at which it is determined whether or not the operation of the powder material compression molding machine is stopped; and a non-control range portion NCP.

First of all, the decompression/compression control range portion ECP is constituted of: an open region UEA, which is equal to or higher than a set open value OSV set centering on the target pressure set value TP and lower than an upper limit decrease pressure set value UPV for setting the removal control range portion RCP, described later; a compression region LEA, which is equal to or lower than a compression set value PSV and equal to or higher than a lower limit increase pressure set value LPV; and the increase/decrease control range portion PCP. In the present preferred embodiment, the set open value OSV is set to a value lower than the upper limit decrease pressure set value UPV for setting the increase/decrease control range portion PCP: in contrast, the compression set value PSV is set to a value higher than the lower limit increase pressure set value LPV.

The increase/decrease control range portion PCP is constituted of: a decrease control region DPA, which is equal to or higher than the upper limit decrease pressure set value UPV and lower than an upper limit removal pressure set value URV; an increase control region IPA, which is equal to or lower than the lower limit increase pressure set value LPV and equal to or higher than a lower limit removal pressure set value LRV; and the removal control range portion RCP. Here, the present preferred embodiment is directed to measure the weight of the tablet Q, and therefore, the increase/decrease control range portion PCP is not substantially used.

The removal control range portion RCP is constituted of: an upper removal region URA, which is equal to or higher than the upper limit removal pressure set value URV and lower than an upper stop pressure set value USV; and a lower removal region LRA, which is equal to or lower than the lower limit removal pressure set value LRV and equal to or higher than a lower stop pressure set value LSV.

The stoppage control range portion SCP is constituted of an upper stop region USA, which is equal to or higher than the upper stop pressure set value USV, and a lower stop region LSA, which is equal to or lower than the lower stop pressure set value LSV. The stoppage control range portion SCP is adapted not to perform the thickness control, described later, but to determine whether or not a measured pressure indicates an abnormal value so as to forcibly stop the operation.

As a consequence, the determination whether or not the measured pressure is a value included within the removal control range portion RCP and the determination whether or not the measured pressure is a value included within the stoppage control range portion SCP are sequentially conducted after the start of the measurement of the pressure independently of the thickness control and the quantity control.

The non-control range portion NCP signifies a region which is higher than the compression set value PSV and lower than the set open value OSV. Here, the target pressure set value TP is calculated by bisecting the sum of the set open value OSV and the compression set value PSV or by bisecting the sum of the upper limit decrease pressure set value UPV and the lower limit increase pressure set value LPV.

With the above-described configuration, first in step S1, it is determined whether or not it is a data collection start time. In other words, a thickness control program, which executes a thickness control, that is, a compression pressure control, is repeatedly executed per predetermined period of time after the operation of the powder material compression molding machine is started. Therefore, the time, at which the control program is executed, is set per predetermined period of time. Note that the weight and the pressure are not measured in synchronism with the start of the control program, but they are continuously measured in synchronism with the operational status of the molding machine body 1 in the measuring instrument 2 (for measuring the weight) and the third controller 113 (for measuring the pressure).

In step S1, if it is determined that it is a data collection start time, a turn counter is incremented in step S2. The turn counter is designed to count the execution of the control program as one turn, and it may be formed by software in the control unit 11. Here, the turn counter stores the number of counted turns even if a power source of the powder material compression molding machine is turned off, and cannot be reset unless an operator performs the operation. This is designed to prevent any unnecessary control from being performed after the power source is turned off by an emergency stop of the powder material compression molding machine for a short period of time. Latest values indicating the weight and the pressure are read by the first controller 111, to be used for the quantity control and the thickness control. In the present preferred embodiment, the measured weight signifies the total weight of the predetermined number of tablets Q, and further, the pressure signifies a latest pressure to be applied to the pair of punches 5 and 6 in the main compression rolls 94 and 95.

In step S3, latest values indicating the quantity, pressure and weight measured and stored at this time, that is, at the data collection start time are read in, and further, respective pressure set values defining the increase/decrease control range portion PCP set at this time are read in. The quantity is equivalent to the amount of filled powder material P and depends on the tip position of the lower punch 6 inside of the die 4, so that it can be represented by positional data on the quantity adjusting rail 82. In view of this, the quantity is detected by the potentiometer 123. The pressure is measured by the control unit 11 in response to an output signal from the load cell 13, to be thus stored and read inside of the control unit 11. The predetermined number of tablets Q, for example, 10 tablets are sampled, and thus, the total weight of the sampled tablets Q is measured by the measuring instrument 2. The weight measured by the measuring instrument 2 is stored inside of the measuring instrument 2, and further, is read in by the control unit 11 via the serial signal line SL1. The measured quantity, pressure and weight are stored inside of the control unit 11.

In step S4, it is determined whether the measured weight falls within the non-control range NWC or the control requiring range WC. That is to say, it is determined, based on the determination of the weight of the measured tablets Q, whether or not the control of the weight and thickness of the tablet Q is necessary. If it is determined that the measured weight falls within the control requiring range WC, the quantity and thickness are controlled in step S5. In contrast, if it is determined that the measured weight does not fall within the control requiring range WC, that is, that the weight of the tablet Q is normal, only the thickness is controlled in step S6.

In the quantity control in step S5, a correction quantity is calculated based on the standard weight SW, the measured quantity and the measured weight, wherein the quantity adjusting rail 82 is controlled until the calculated correction quantity is obtained. Specifically, if the calculated correction quantity is smaller than a current quantity, the control unit 11 outputs a control signal to the powder material amount adjuster 12 in such a manner as to decrease the quantity, thereby ascending the quantity adjusting rail 82. To the contrary, if the correction quantity is greater than the current quantity, the control unit 11 descends the quantity adjusting rail 82 in such a manner as to increase the quantity, thereby controlling the quantity. The correction quantity is calculated by the following equation:

$$\text{Correction quantity}=\text{current quantity}\cdot(\text{standard weight}/\text{current weight}) \quad (1)$$

In Equation (1), the current quantity and the current weight are the latest quantity and weight which are read in step S3.

Figure 8:
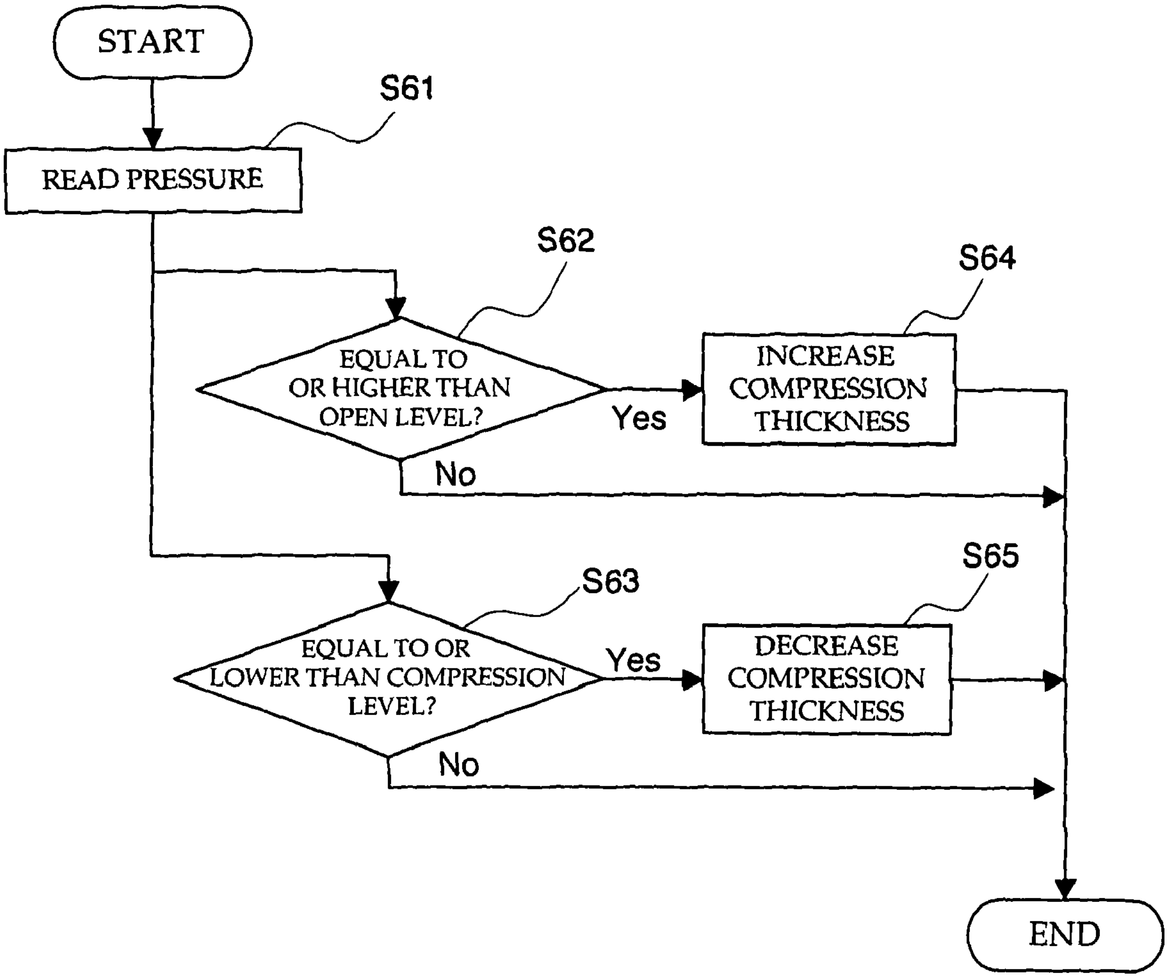
FIG. 8 is a flowchart illustrating schematic control procedures in the preferred embodiment.

The thickness control in steps S5 and S6 is performed resulting from the measurement by the control unit 11 in response to the output signal from the load cell 13 and the determination based on the pressure stored in the control unit 11, as illustrated in FIG. 8. Specifically, first in step S61, a latest pressure stored at this time is read in. In this case, the pressure may be one measurement value or may be an average of all measurement values which are measured per one rotation of the turret.

Next, in steps S62 and S63, it is determined whether or not the measured pressure satisfies each of criteria. Specifically, in step S62, it is determined, based on the open set value OSV, whether or not the measured pressure is equal to or higher than an open level. Furthermore, in step S63, it is determined, based on the compression set value PSV, whether or not the measured pressure is equal to or lower than a compression level.

In step S62, if the measured pressure is equal to or higher than the open set value OSV and lower than the upper stop pressure set value USV, to be thus determined that the measured pressure is equal to or higher than the open level, a compression thickness is increased in step S64. In other words, the control unit 11 operates the motor 141, thereby descending the position of the lower main compression roll 95. In this manner, the distance between the upper and lower main compression rolls 94 and 95 is increased.

In step S63, if the measured pressure is equal to or lower than the compression set value PSV and equal to or higher than the lower stop pressure set value LSV, to be thus determined that the measured pressure is equal to or lower than the compression level, the compression thickness is decreased in step S65. In other words, the control unit 11 operates the motor 141, thereby ascending the position of the lower main compression roll 95. In this manner, the distance between the upper and lower main compression rolls 94 and 95 is decreased.

As described above, in the case where the weight of the tablet Q is normal or the control in step S5 is performed, the position of the lower main compression roll 95 is controlled and the thickness of the tablet Q is adjusted while controlling the weight based on the determination which criterion the pressure in compressively molding the powder material satisfies. For example, when the powder material compression molding machine is started to be operated, its interior temperature is increased, thereby increasing the size of the upper and/or lower punch. The change in size of the punch can be detected in accordance with the increase in compressively molding pressure when the weight of the powder material is normal, in other words, when the weight of the tablet Q falls within the non-control range NWC.

In this operational status, the latest pressure at this time is taken in. When the taken-in pressure becomes equal to or higher than the open set value OSV, the position of the lower main compression roll 95 is adjusted, that is, is descended lower than the current position, so as to increase the compression thickness. Consequently, after the adjustment of the lower main compression roll 95, the distance between the upper and lower main compression rolls 94 and 95 is increased, thus preventing the thickness of the tablet Q from being equal to or less than a specified value.

To the contrary, when the taken-in pressure becomes equal to or lower than the compression set value PSV, the position of the lower main compression roll 95 is ascended higher than the current position, so as to decrease the compression thickness. As a result, after the adjustment, the distance between the upper and lower main compression rolls 94 and 95 is decreased, so that the thickness of the tablet Q becomes the specified value. In this manner, the thickness of the tablet Q can be held within a reference thickness range.

Note that although the plurality of tablets Q are sampled, and then, the sum of the measured weights is regarded as the weight for use in the quantity control in the above-described preferred embodiment, a weight of a tablet Q individually measured may be used or an average weight of a plurality of tablets Q may be used. The weight may be manually measured, and thereafter, the measured weight may be manually input into the control unit 11.

Figure 9:
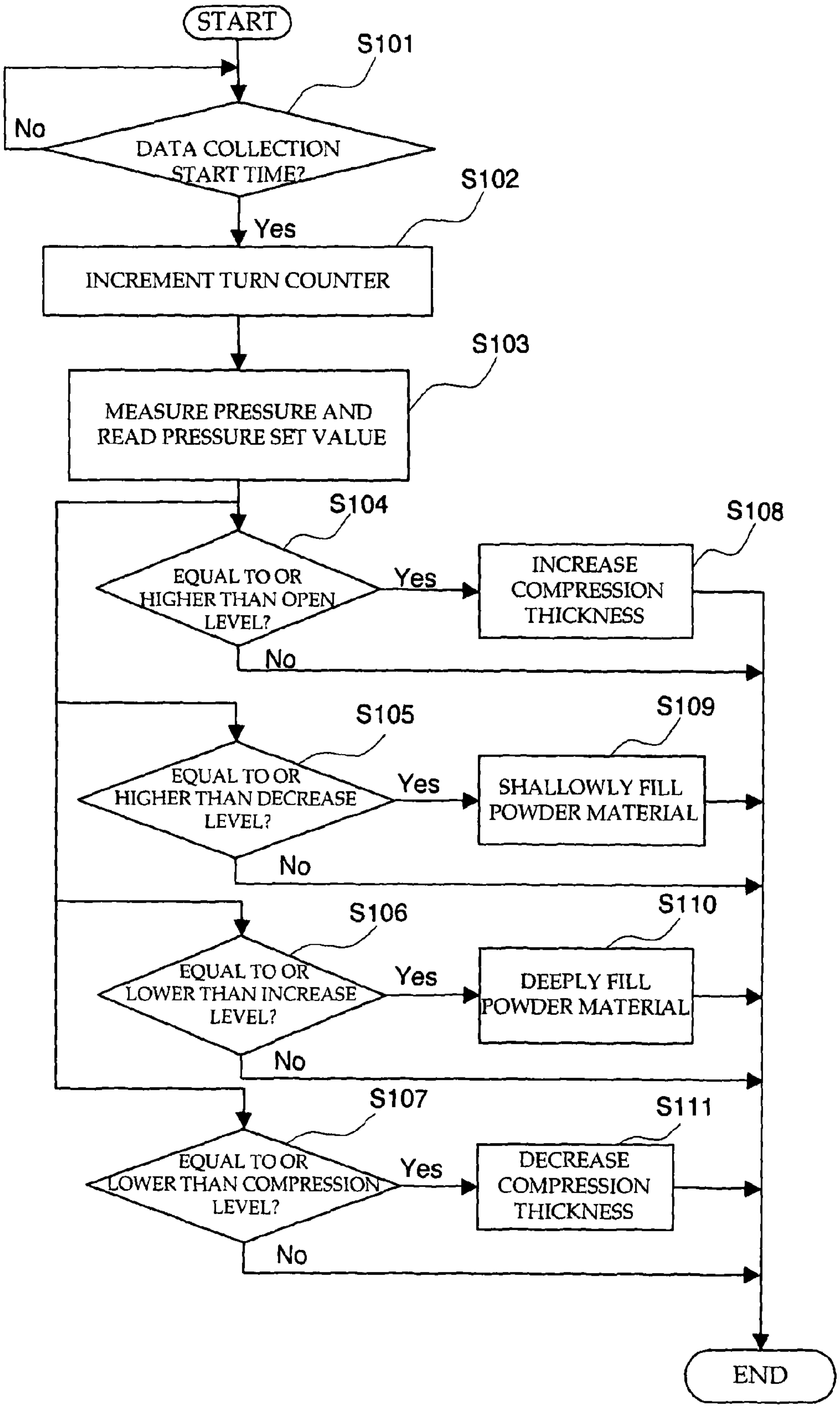
FIG. 9 is a flowchart illustrating schematic control procedures in another preferred embodiment according to the invention.

Moreover, although the tablet Q is sampled, and then, the weight is measured in the above-described preferred embodiment, the weight of the tablet Q may be estimated based on the detected pressure. Specifically, the pressure during the compression is varied according to the amount of powder material filled in the die 4, that is, the weight of the tablet Q. If the amount of filled powder material is much, the weight of the tablet Q becomes heavy. The pressure is measured based on the relationship between the pressure and the weight, as described above, and then, the thickness and weight of the tablet Q are controlled according to the weight of the tablet Q estimated from the measured pressure in accordance with control procedures, described later, as illustrated in FIG. 9. Note that the control unit 11 having a control program different from that in the above-described preferred embodiment may be used in the present preferred embodiment.

First in step S101, it is determined whether or not it is a data collection start time. If it is determined that it is a data collection start time, a turn counter is incremented in step S102. Thereafter, in step S103, a pressure is measured, and further, a pressure set value is read in, like in step S3.

Next, it is determined in steps S104 to S107 whether or not measured pressures satisfy criteria. In other words, the steps S104 and S107 correspond to the above-described steps S62 and S63, respectively. In step S104, it is determined, based on the open set value OSV, whether or not the measured pressure is equal to or higher than an open level. Furthermore, in step S107, it is determined, based on the compression set value PSV, whether or not the measured pressure is equal to or lower than a compression level. In step S105, it is determined, based on the upper limit decrease pressure set value UPV, whether or not the measured pressure is equal to or higher than a decrease level. In step S106, it is determined, based on the lower limit increase pressure set value LPV, whether or not the measured pressure is equal to or lower than an increase level. Here, the controls in steps S104 to S107 are processed at substantially the same time.

In step S104, if the measured pressure is equal to or higher than the open set value OSV and lower than the upper stop pressure set value USV, to be thus determined that the measured pressure is equal to or higher than the open level, a compression thickness is increased in step S108. In other words, the control unit 11 operates the motor 141, thereby descending the position of the lower main compression roll 95. In this manner, the distance between the upper and lower main compression rolls 94 and 95 is increased.

In step S107, if the measured pressure is equal to or lower than the compression set value PSV and equal to or higher than the lower stop pressure set value LSV, to be thus determined that the measured pressure is equal to or lower than the compression level, the compression thickness is decreased in step S111. In other words, the control unit 11 operates the motor 141, thereby ascending the position of the lower main compression roll 95. In this manner, the distance between the upper and lower main compression rolls 94 and 95 is decreased.

In step S105, if it is determined that the measured pressure is equal to or higher than the upper limit decrease pressure set value UPV and lower than the upper stop pressure set value USV, and therefore, that the measured pressure is the decrease level or higher, the powder material is shallowly filled in step S109. In other words, the control unit 11 operates the motor 121, thereby ascending the position of the quantity adjusting rail 82. As a consequence, the amount of powder material is decreased.

In step S106, if it is determined that the measured pressure is equal to or lower than the lower limit increase pressure set value LPV and equal to or higher than the lower stop pressure set value LSV, and therefore, that the measured pressure is equal to or lower than the increase level, the powder material is deeply filled in step S110. In other words, the control unit 11 operates the motor 121, thereby descending the position of the quantity adjusting rail 82. As a consequence, the amount of powder material is increased.

Incidentally, in the case where the detected pressure does not satisfy a condition in each of steps S104 to S107, it is determined that the pressure is included in the non-control range portion NCP, thereby ending the control routine.

In this manner, the weight and thickness of the tablet Q are adjusted based on the measured pressure. That is to say, if the measured pressure is included in the decompression/compression control range portion PCP, the quantity, that is, the weight of the tablet Q is adjusted. In contrast, if the measured pressure is included in the increase/decrease control range portion ECP, the thickness of the tablet Q is adjusted.

Thus, the same effects as those in the above-described preferred embodiment can be produced.

Here, in the present modification, it may be determined between steps S103 and S104 whether or not the detected pressure is included in the non-control range portion NCP.

Alternatively, the specific constitution of each of the components is not limited to the above-described preferred embodiments, and therefore, various modifications may be implemented without departing from the scope of the invention.

What is claimed is:

1. A control unit for a powder material compression molding machine including a powder material compressor that compresses a powder material filled between compressing members in an adjusted filled amount by making the compressing members approach to each other at a predetermined interval, to mold a molded product, and a pressure detector that detects a powder material compressing pressure by the powder material compressor, in connection to the powder material compression molding machine, the control unit comprising:

- a weight determiner that determines that a weight of filled powder material is normal if a weight of a tablet which is molded by the powder material compression molding machine falls within a non-control range of a quantity;
- a thickness determiner that determines that a thickness of the molded product is abnormal if the pressure detected by the pressure detector falls out of a first predetermined range and the weight determiner determines that the weight of filled powder material is normal; and
- a compression controller that controls the powder material compressor if the thickness determiner determines that the thickness of the molded products is abnormal.

2. A control unit for a powder material compression molding machine according to claim 1, wherein the first predetermined range comprises a first upper limit and a first lower limit less than the first upper limit, and

- wherein the detected compressing pressure is outside of the first predetermined range if the detected compressing pressure is equal to or is greater than the first upper limit or is equal to or is less than the first lower limit.

3. A control unit for a powder material compression molding machine according to claim 2, further comprising:

- a filled amount adjuster that adjusts the filled amount of powder material; and
- a filled amount controller that controls the filled amount adjuster based on an abnormality determined if the weight determiner determines the weight of the tablet is outside of the non-control range of the quantity,
- wherein the powder material compressor is controlled by the compression controller while the filled amount adjuster is controlled by the filled amount controller.

4. A control unit for a powder material compression molding machine according to claim 2, wherein, if the detected compressing pressure is equal to or greater than the first upper limit, then the compression controller increases a target thickness, and

- wherein, if the detected compressing pressure is equal to or less than the first lower limit, then the compression controller decreases the target thickness.

5. A control unit for a powder material compression molding machine according to claim 2, wherein, if the thickness of the molded products is abnormal and the pressure detected by the pressure detector is greater than the first upper limit, then the powder material compressing pressure is decreased, and

- wherein, if the thickness of the molded products is abnormal and the pressure detected by the pressure detector is less than the first lower limit, then the powder material compressing pressure is increased.

6. A control unit for a powder material compression molding machine according to claim 1, further comprising:

a filled amount adjuster that adjusts the filled amount of powder material; and a filled amount controller that controls the filled amount adjuster based on an abnormality determined if the weight determiner determines the weight of the tablet is outside of the non-control range of the quantity, wherein the powder material compressor is controlled by the compression controller while the filled amount adjuster is controlled by the filled amount controller.

7. A control unit for a powder material compression molding machine according to claim 1, wherein the compressing members include an upper compression member and a lower compression member, and wherein the compression controller signals an ascent of the lower compression member or a descent of the lower compression member, which controls the thickness of the molded product.

8. A control unit for a powder material compression molding machine according to claim 1, wherein the pressure detector comprises a load cell disposed on one of the compression members.

9. A control unit for a powder material compression molding machine according to claim 1, wherein the weight determiner determines the weight of filled powder material by measuring an average weight of a plurality of tablets.

10. A powder material compression molding machine comprising:

a powder material compressor that compresses a powder material filled between compressing members by making the compressing members approach to each other at a predetermined interval, to mold a molded product;

a filled amount adjuster that adjusts an amount of powder material to be filled;

a pressure detector that detects a powder material compressing pressure by the powder material compressor;

a filled amount controller that controls the filled amount adjuster based on the compressing pressure detected by the pressure detector; and a compression controller that controls the powder material compressor based on the compressing pressure detected by the pressure detector, wherein the powder material compressor is controlled by the compression controller while the filled amount adjuster is controlled by the filled amount controller.

11. A powder material compression molding machine according to claim 10, wherein the filled amount adjuster includes a lower compressing member, positioned distant from an opening of a die by a distance based on a desired amount of powder material.

12. A powder material compression molding machine according to claim 10, wherein if the compressing pressure is greater than a non-control upper limit, then the compression controller decreases a compression amount of the powder material compressor, wherein if the compressing pressure is greater than an upper limit decrease pressure limit, which is greater than the non-control upper limit, then the filled amount controller decreases the amount of powder material to be filled, wherein if the compressing pressure is less than a non-control lower limit, then the compression controller increases the compression amount of the powder material compressor, and wherein if the compressing pressure is less than a lower limit increase pressure limit, which is less than the non-control lower limit, then the filled amount controller increases the amount of powder material to be filled.

* * * * *